(12) United States Patent
Langkau et al.

(10) Patent No.: US 12,429,112 B2
(45) Date of Patent: Sep. 30, 2025

(54) DRIVE DEVICE FOR AN OPENING MECHANISM FOR OPENING A MOVABLE OPENING ELEMENT OF A VEHICLE, AND OPENING SYSTEM FOR A VEHICLE

(71) Applicant: HELLA GmbH & Co. KGaA, Lippstadt (DE)

(72) Inventors: Johannes Langkau, Olsberg (DE); Jost Kleine-Weischede, Kamen (DE); Matthias Humpe, Oelde (DE); Bodo Buecker, Arnsberg (DE)

(73) Assignee: Hella GmbH & Co. KGaA, Lippstadt (DE)

(*) Notice: Subject to any disclaimer, the term of this patent is extended or adjusted under 35 U.S.C. 154(b) by 0 days.

(21) Appl. No.: 18/621,078

(22) Filed: Mar. 28, 2024

(65) Prior Publication Data

US 2024/0240506 A1    Jul. 18, 2024

Related U.S. Application Data

(63) Continuation of application No. PCT/EP2022/074606, filed on Sep. 5, 2022.

(30) Foreign Application Priority Data

Sep. 29, 2021  (DE) .................... 10 2021 125 218.0
Jan. 17, 2022   (DE) .................... 10 2022 100 974.2

(51) Int. Cl.
  *F16H 57/031*  (2012.01)
  *F16H 1/06*    (2006.01)
  *B60K 15/05*   (2006.01)

(52) U.S. Cl.
  CPC ............. *F16H 1/06* (2013.01); *F16H 57/031* (2013.01); *B60K 2015/0538* (2013.01);
  (Continued)

(58) Field of Classification Search
  CPC ....... B60K 2015/053; B60K 2015/0515; E05F 15/614; E05Y 2900/534; F16H 57/031; F16H 1/06
  See application file for complete search history.

(56) References Cited

U.S. PATENT DOCUMENTS 3,821,567 A     6/1974  Erwin
10,637,327 B2   4/2020  Niekamp
(Continued)

FOREIGN PATENT DOCUMENTS

DE   102008039313 A1     2/2010
DE   202009011844 U1 *   2/2011  ............. B60S 1/166
(Continued)

OTHER PUBLICATIONS

English translation of DE102014107900A1 from WIPO (Year: 2014).*

(Continued)

*Primary Examiner* — Daniel J Troy
*Assistant Examiner* — Susan M. Heschel
(74) *Attorney, Agent, or Firm* — Muncy, Geissler, Olds & Lowe, P.C.

(57) ABSTRACT

A drive device for an opening mechanism for opening a movable opening element of a vehicle. The drive device comprising: a drive unit for generating the drive torque; a housing having a mounting side which can be oriented towards a vehicle part of the vehicle in order to mount the drive device; and a gearbox for increasing the drive torque of the drive unit. The gearbox having a drive-side, first gearbox unit comprising a first gear which has a first axis of rotation and a first radius, and an output-side second gearbox unit for coupling with the opening mechanism having an output axis. The first gearbox unit and the second gearbox unit being operatively connected to one another. An opening system is also provided.

13 Claims, 4 Drawing Sheets

(52) U.S. Cl.
CPC ....... *E05Y 2201/11* (2013.01); *E05Y 2201/71* (2013.01); *E05Y 2600/626* (2013.01); *E05Y 2900/534* (2013.01)

(56) References Cited

U.S. PATENT DOCUMENTS

| | | | | |
|---|---|---|---|---|
| 10,731,729 | B2* | 8/2020 | Masuzawa | F16H 1/20 |
| 10,836,251 | B2* | 11/2020 | Takeuchi | B60K 15/05 |
| 10,883,298 | B2* | 1/2021 | Hsieh | G03B 21/43 |
| 11,639,165 | B2 | 5/2023 | Baer | |
| 2013/0220073 | A1* | 8/2013 | Suto | H02K 7/1166 |
| | | | | 74/606 R |

FOREIGN PATENT DOCUMENTS

| | | | |
|---|---|---|---|
| DE | 102012111847 A1 | 6/2014 | |
| DE | 102014107900 A1 * | 12/2014 | ........... F16H 57/021 |
| DE | 102016118243 A1 | 3/2018 | |
| DE | 102016217710 A1 | 3/2018 | |
| DE | 102017131096 A1 | 6/2019 | |
| JP | 2005054950 A | 3/2005 | |
| JP | 2008039096 A | 2/2008 | |
| JP | 2019011616 A | 1/2019 | |
| WO | WO2017029124 A1 | 2/2017 | |

OTHER PUBLICATIONS

English translation of DE202009011844U1 from WIPO (Year: 2009).*

International Search Report dated Dec. 2, 2022 in corresponding application PCT/EP2022/074606.

* cited by examiner

DRIVE DEVICE FOR AN OPENING MECHANISM FOR OPENING A MOVABLE OPENING ELEMENT OF A VEHICLE, AND OPENING SYSTEM FOR A VEHICLE

This nonprovisional application is a continuation of International Application No. PCT/EP2022/074606, which was filed on Sep. 5, 2022, and which claims priority to German Patent Application No. 10 2021 125 218.0 which was filed in Germany on Sep. 29, 2021, and to German Patent Application No. 10 2022 100 974.2, which was filed on Jan. 17, 2022, and which are all herein incorporated by reference.

BACKGROUND OF THE INVENTION

Field of the Invention

The invention relates to a drive device for an opening mechanism for opening a movable opening element of a vehicle, as well as an opening system for a vehicle.

Description of the Background Art

Actuating drives with transmissions for driving opening mechanisms of movable opening elements, such as doors or fuel filler doors in motor vehicles, are known from the prior art. The transmissions frequently are multistage in design here in order to be able to provide a certain speed ratio while taking specified installation space dimensions into account. For example, a drive device with a multistage transmission is known from WO 2017/029124 A1, which corresponds to US 2018/0241282.

On account of the speed ratio for increasing a drive torque from the motor to the output of the transmission, such transmissions often have the disadvantage, however, that the output shaft is arranged relatively far away, in the center on the output side of the housing. If the housing is arranged to the side on a vehicle part, a pickoff of the drive torque at the drive shaft must therefore take place at a great distance from the vehicle part. However, this has an effect on the design of the opening mechanism, which consequently must likewise extend into the vehicle interior as far as the output shaft for pickoff of the drive torque.

SUMMARY OF THE INVENTION

It is therefore an object of the present invention to at least partially overcome the above disadvantages known from the prior art. In particular, it is an object of the present invention to make possible a spacing of an output of a drive device close to a mounting side of the drive device in a compact design, preferably in order to make possible a more compact drive of an opening mechanism for opening a movable opening element of a vehicle.

The above object is attained by a drive device as well as an opening system. Of course, features and details that are described in connection with the drive device according to the invention also apply in connection with the opening system according to the invention and vice versa in each case, so mutual reference is or can always be made with regard to the disclosure of the individual aspects of the invention.

According to a first aspect of the invention, a drive device for an opening mechanism for opening a movable opening element of a vehicle is provided. The drive device has a drive unit for producing the drive torque. Furthermore, the drive device includes a housing with a mounting side that can be oriented toward a vehicle part of the vehicle for mounting the drive device. In addition, the drive device has a transmission for increasing the drive torque of the drive unit. The transmission includes a first gear unit on the driven side. The first gear unit has a first gear that has a first rotational axis and a first radius. The transmission also includes a second gear unit on the output side for coupling to the opening mechanism and having an output axis. The first gear unit and the second gear unit are in operative connection with one another. An additional gear can be provided between the drive unit and the first gear unit. Furthermore, provision is made that the output axis extends in an output region between the mounting side and the first rotational axis, and has a distance from the first rotational axis that is smaller than the first radius.

The movable opening element can be, in particular, a fuel filler door for access to a fuel tank of the vehicle and/or a charging door for access to an electrical charging connector of the vehicle. For example, the vehicle can be a hybrid and/or electric vehicle. In this case, the drive device can be designed to automatically open the movable opening element during the opening process. For example, the drive unit can constitute an actuator and/or an actuating drive. In particular, the drive unit can have an electric motor and/or a printed circuit board for controlling the electric motor. The vehicle part can be, in particular, a part of a vehicle body. Preferably, the drive device is designed for fastening to an inner side of the vehicle part, which is to say, in particular, beneath the vehicle body. The mounting side can be capable of being aligned relative to the vehicle part and/or of being arranged directly on the vehicle part.

The housing can protect the first and second gear units at least partially or completely. To this end, a first and a second housing element of the housing can, for example, be fastened to one another in a sealing manner. Preferably, the housing is made of a plastic.

For the purpose of increasing the drive torque, the transmission has, in particular, a speed ratio greater than one. Consequently, the transmission can be designed for a speed ratio from a high speed to a low speed. As a result, the drive torque can be increased by the transmission. The phrase "the first gear unit is implemented on the driven side" can be understood to mean that the first gear unit is connected directly to the drive unit or can be connected directly to the drive unit. An additional gear can also be interposed, however. The phrase "the second gear unit is implemented on the output side" can be understood to mean that the second gear unit is connected directly to the opening mechanism or can be connected directly to the opening mechanism. Owing to the operative connection of the first and second gear units, the drive unit and the opening mechanism can therefore be coupled indirectly or be capable of being coupled indirectly. The operative connection of the first and second gear units can be, for example, a meshing of a gear of the first and second gear units. Alternatively, it is possible that the first and second gear units are in operative connection through an axial connection.

The first gear can be designed as a gear wheel. The first radius can be a pitch circle radius, a tooth circle radius, and/or an outer radius of the first gear. The first rotational axis and the output axis preferably can be understood as geometric axes. In particular, the first gear rotates about the first rotational axis in this case. The output axis can be defined by an output shaft of the second gear unit for coupling to the opening mechanism.

The output region can be understood to be a space between the mounting side and the first rotational axis. In particular, the first rotational axis of the first gear is arranged parallel to and/or spaced apart from the output axis. In particular, as a result the output axis runs, in particular completely, within the first radius and/or within a first diameter of the first gear.

Because the output axis extends in the output region between the mounting side and the first rotational axis, a compact installation space of the drive device can be achieved as a result. While the largest gear wheel in conventional actuating drives often also defines the position of the output, it has been found within the scope of the present invention that the output axis can be moved closer to the mounting side, and thus closer to a vehicle part in the mounted state of the drive device, owing to the additional, second gear unit. At the same time, it is possible to avoid or reduce an increase in the installation space beyond the first radius. Provision can be made that the output axis and/or the mounting side are capable of being fastened to a vehicle part and/or a mounting bracket parallel or essentially parallel to the vehicle part of the vehicle. Consequently, owing to the second gear unit, an additional gear stage, for example, can be formed that serves in particular to reduce the distance between the output axis and the mounting side.

The second gear unit has a second gear for rotation about the output axis, wherein the first gear and the second gear are in operative connection through a third gear that is axially connected to the first gear. The gear can, for example, be gear wheels of the gear unit. The third gear can be part of the second gear unit. In particular, it is possible that the second and third gear form a gear stage of the second gear unit. The second and third gear can mesh with one another or can be caused to mesh. On account of the axial connection of the first and third gear, the drive torque can be transmitted from the first gear unit to the second gear unit in a simple manner.

In addition, it is possible in a drive device according to the invention that the first gear, the second gear, and the third gear are each designed as a spur gear. Consequently, the output axis and the first rotational axis can advantageously be aligned parallel or essentially parallel. Simple and economical manufacture can be achieved owing to the design as spur gears. The drive device can be compact in design owing to the parallel alignment of the axes. As a result, the drive device can be arranged advantageously on the vehicle part, in particular beneath a vehicle body.

It is furthermore possible in a drive device according to the invention that the first gear and the second gear are separated from one another by a cover of a cover element. In this case, the cover serves the purpose, in particular, that the first and second gear do not collide axially. For example, the first and second gear can each be supported with play, wherein the cover element limits the play of the first and/or second gear, in particular on one side. The cover element can be designed as an end plate, in particular. The cover can be designed to be flat in a space-saving manner. Owing to the separation of the first and second gear by the cover, the first and second gear can have a short distance from one another axially, so that a compact design of the drive unit is facilitated.

In addition, provision can advantageously be made in a drive device according to the invention that the cover element has, for supporting the second gear, an axle spindle that extends from the cover and/or defines the output axis. As a result, an at least partial supporting of the second gear can take place when the cover element is placed on an opening of the first housing element. Provision can be made that the second gear is additionally supported on the first housing element. To this end, the first housing element can have a receptacle for supporting the second gear. Owing to the immobilization of the cover element between the first and second housing elements, an adequate bearing force for supporting the second gear can be applied. Consequently, the mounting can be further simplified with a compact design of the gear unit at the same time. To reduce weight and/or to avoid accumulations of material, the axle spindle can be designed to be hollow.

In addition, provision can advantageously be made in a drive device according to the invention that the housing has a spreading geometry via which at least two retaining elements of the cover element, which extend from the cover to a housing cover of the housing, can be pressed in opposite directions, in particular elastically, during mounting of the gear units, so that the cover element is immobilized between a first housing element of the housing and the housing cover. The housing cover can constitute a second housing element. The cover element can consequently be clamped, in particular between the first housing element and the housing cover, via the retaining elements. Advantageously, the retaining elements can be arranged on opposite sides of the cover in order to permit a centered immobilization of the retaining element. For example, the retaining elements can extend from the cover in the manner of a clip. Provision can furthermore be made that the retaining elements can be pressed outward during mounting, which is to say, in particular, toward an outer diameter of the cover and/or toward the first radius, owing to the spreading geometry. As a result, an installation space can remain free between the retaining elements, for example for the first gear. In particular, the retaining elements can be designed in the manner of a rib. As a result, an elastically deformable, in particular flexible, cross section can be provided. The spreading geometry can include one or more projections whose outer surfaces have a greater distance from one another than the retaining elements have from one another. Owing to the elastic spreading of the retaining elements, an additional retaining force can be applied between the retaining elements and the second housing element to immobilize the cover element. Owing to the spreading, the preloading can be applied in a simple manner when the second housing element is set in place.

In addition, it is possible in a drive device according to the invention that the first gear and the third gear are integrally connected to one another. In particular, the first gear can be molded onto the third gear in a plastic injection molding process. Preferably, the third gear and/or the second gear has a metal material. As a result, high torques can be transmitted, in particular even with a small diameter of the third and/or second gear. As a result, a design of the drive device can be achieved that is compact and, at the same time, suitable for mounting.

In addition, provision can advantageously be made in a drive device according to the invention that the second gear has a second radius and the third gear has a third radius, wherein the second radius and the third radius are equal or essentially equal in size. The second radius and the third radius can be understood to be, in particular, a pitch circle radius, a tooth circle radius, and/or an outer radius. Consequently, a speed ratio factor between the third and second gear can be one or nearly one. In particular, it is possible that the speed ratio of the second gear stage is between 1 and 1.5, preferably exactly 1. As a result, the second gear stage can have only a minor influence on the transmission properties of the transmission, and at the same time permit displacement of the output axis toward the mounting side.

Preferably, provision can be made in a drive device according to the invention that the first gear unit is multi-stage in design. The second gear unit can advantageously be single-stage in design. Owing to the multistage design of the first gear unit, a high speed ratio of the drive torque can be achieved. Furthermore, installation space can be limited, as a result of which the drive device can be arranged advantageously on the vehicle part, in particular beneath a vehicle body.

It is furthermore possible within the scope of the invention that the second gear and/or the third gear are made of metal. As a result, high torques can be transmitted, in particular even with a small diameter of the third and/or second gear, thus permitting the compact construction even with high requirements on the drive torque. Furthermore, the first gear can advantageously be molded onto the third gear in a plastic injection molding process, for example. In this case, the third gear can serve as an insert in an injection molding tool.

Furthermore, provision can advantageously be made in a drive device according to the invention that the housing has fastening elements via which the housing can be fastened to the vehicle in a fastening direction that is parallel to the first rotational axis. As a result, the housing can advantageously be arranged on a mounting bracket. The fastening elements can include fasteners and/or openings for a fastener.

Furthermore, provision can advantageously be made in a drive device according to the invention that the drive unit is arranged within the housing. In particular, the drive unit can be permanently in operative connection with the first gear unit in this case. As a result, the drive unit can likewise be at least partially or completely protected by the housing. Furthermore, mounting of the drive device on the vehicle part can be simplified as a result, since the drive device can be handled as an assembly during mounting.

According to another aspect of the invention, an opening system for a vehicle is provided. The opening system has a movable opening element for uncovering a vehicle opening of the vehicle and an opening mechanism for opening the movable opening element. Furthermore, the opening system includes a drive device according to the invention.

Consequently, an opening system according to the invention provides the same advantages as have already been described in detail with respect to a drive device according to the invention. The vehicle opening can be a charging port and/or a fuel filler opening of the vehicle. Provision can be made that the opening system furthermore has a vehicle part on which the movable opening element and/or the drive device are mounted. Furthermore, it is possible that the opening system has a mounting bracket for fastening the drive device to the vehicle part. The opening mechanism can have, for example, a lever mechanism for guiding the movable opening element during opening of the movable opening element. Furthermore, the opening mechanism can be coupled directly or indirectly to the drive device. Preferably, a drive axis of the opening mechanism coincides with the output axis of the drive device. To this end, a drive shaft of the opening mechanism can be connected to an output shaft, in particular in an interlocking, frictional, and/or integral manner.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

The invention is explained in detail below on the basis of the attached drawings. They schematically show.

DETAILED DESCRIPTION

In the following description of some exemplary embodiments of the invention, identical reference symbols are used for the same technical features, even in different exemplary embodiments.

Figure 1:
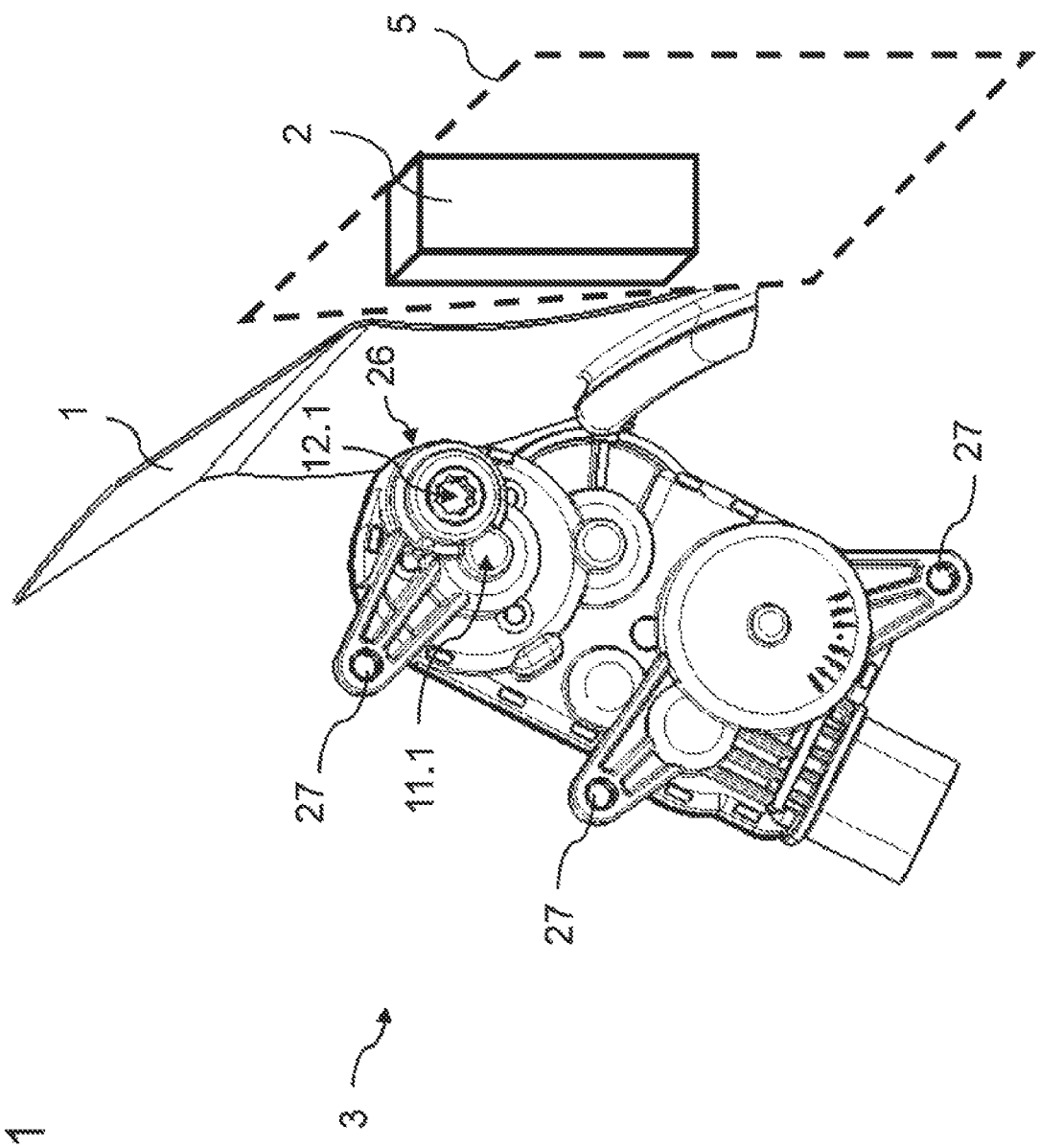
FIG. 1 shows an opening system according to the invention for a vehicle with a drive device according to the invention in a first exemplary embodiment.

FIG. 1 shows an opening system 2 according to the invention in a first exemplary embodiment in a perspective view. The opening system 2 has a movable opening element 5 for uncovering a vehicle opening of the vehicle and an opening mechanism for opening the movable opening element 5. The movable opening element 5 can be, for example, a fuel filler door and/or a charging door for access to an electrical charging connector for a traction battery of the vehicle. In addition, the opening system 2 includes a drive device 3 according to the invention.

Figure 3:
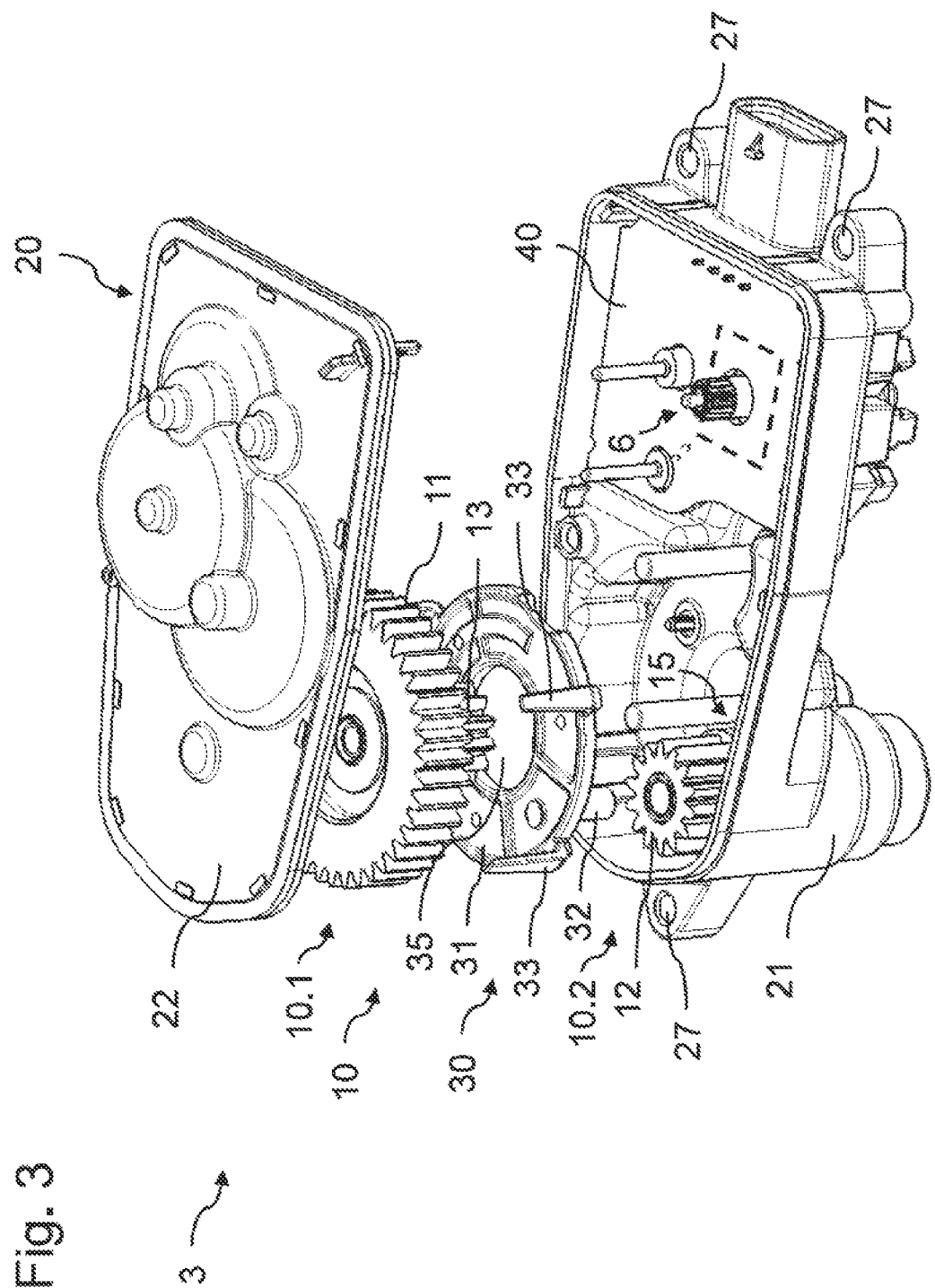
FIG. 3 shows the drive device in an exploded view.
Figure 4:
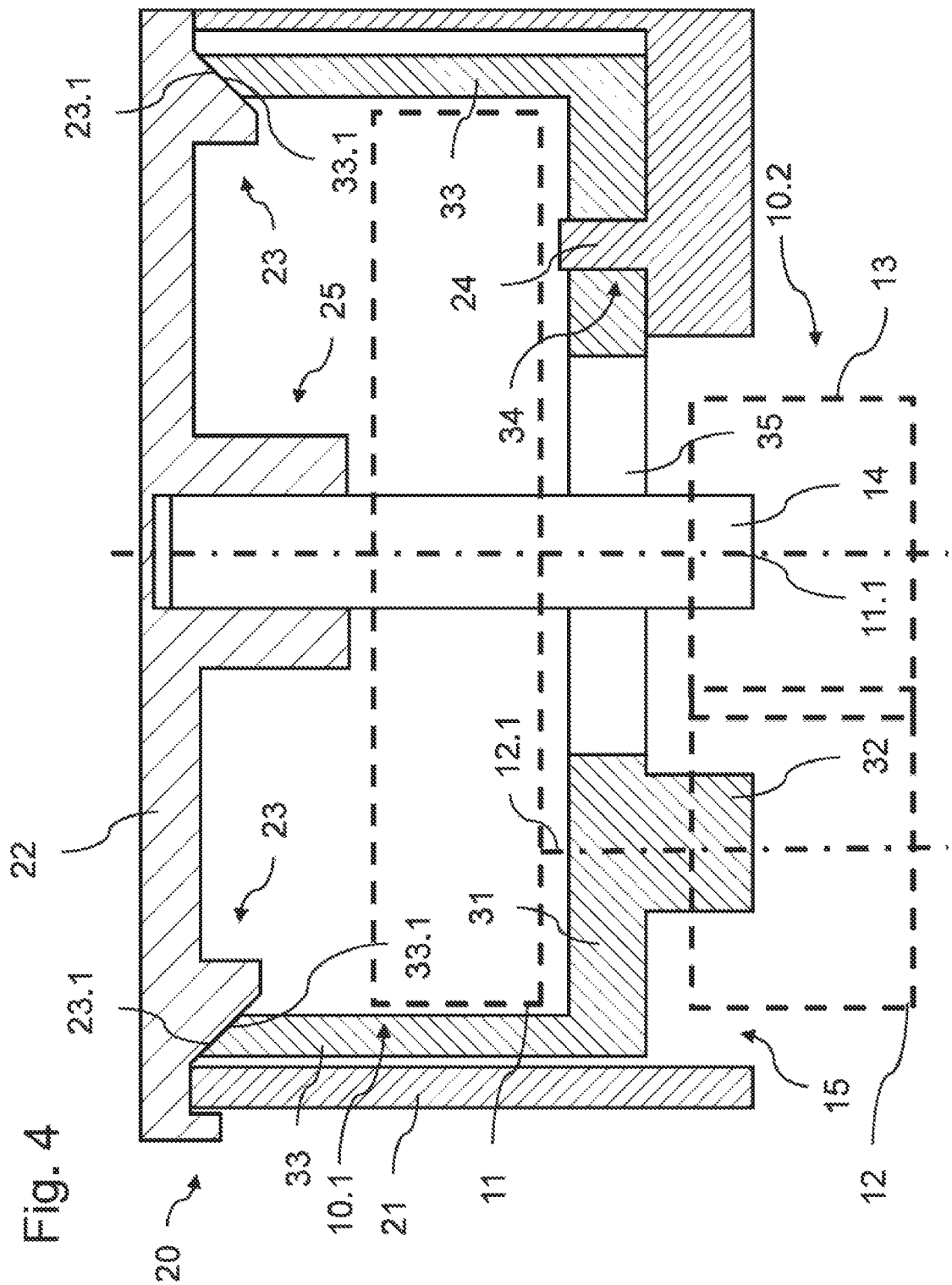
FIG. 4 shows a cross section of a part of a housing of the drive device.

The drive device 3 is shown in FIG. 3 in an exploded view. The drive device 3 has a drive unit 6, in particular with an electric motor, for producing the drive torque, a printed circuit board 40 for controlling the drive unit 6, and a housing 20 with a mounting side 26. As shown in FIG. 1, the mounting side 26 is oriented toward a vehicle part 1 of the vehicle when the drive device 3 is in a mounted state. For the orientation toward the vehicle part 1, the housing 20 can, for example, be attached directly to the vehicle part 1 and/or have fastening elements 27 via which the housing 20 can be fastened to a mounting bracket in a fastening direction that is parallel to the first rotational axis 11.1. The housing 20 preferably includes a first housing element 21 and a second housing element in the form of a housing cover 22, which constitute housing shells that define a housing interior. Preferably, the housing cover 22 can seal the housing interior. To this end, the first housing element 21 and the housing cover 22 can be welded to one another, preferably laser welded. For compact and easy handling, the drive unit 6 is integrated into the housing.

In addition, the drive device 3 includes a transmission 10 (only partially depicted) having a multiplicity of gears for increasing the drive torque of the drive unit 6 and having a first gear unit 10.1 on the driven side and a second gear unit 10.2 on the output side for coupling to the opening mechanism 4. The first gear unit 10.1 and the second gear unit 10.2 are in operative connection with one another in order to transmit the drive torque. The second gear unit 10.2 includes an output axis 12.1, which corresponds to a drive axis of the opening mechanism 4. The first gear unit 10.1 is multistage in design, in particular with a speed ratio factor greater than one, and includes multiple gears. In this case, a first gear 11 is provided that has a first rotational axis 11.1 and a first radius 11.2. For supporting the first gear 11, the first housing element 21 preferably has a preferably cylindrical rotary guide receptacle 25 for receiving a rotary guide 14, in particular in the form of a transmission shaft, of the first gear 11.

The second gear unit 10.2 is preferably single-stage in design and/or forms the output stage of the transmission 10 with the first gear 11. In particular, the second gear unit 10.2 has a second gear 12 for rotation about the output axis 12.1, and a third gear 13 that preferably is supported so as to be rotatable about the first rotational axis 11.1 via an axial connection to the first gear 11. Provision can be made that the first gear 11 and the third gear 13 are integrally connected to one another. The first gear 11 and the second gear 12 are in operative connection through the third gear 13. Preferably, the first gear 11, the second gear 12, and the third gear 13 are each designed as a spur gear.

As is evident from FIG. 3, provision can be made that the first gear 11 and the second gear 12 are separated from one another by a cover 31 of a cover element 30. The cover element 30 in this case has, for supporting the second gear 12, an axle spindle 32 that extends from the cover 31. The output axis 12.1 is therefore defined by the axle spindle 32. In addition, the cover element 30 advantageously has an axle spindle 32 for a supporting of the second gear 12 that is rotatable about the axle spindle 32 and about the second rotational axis. The axle spindle 32 extends from the cover 31 through an opening 15 of the first housing element 21 and can consequently be passed through the opening 15 in a simple manner during mounting. The cover 31 preferably rests on a floor area of the first housing element 21. In order to simplify mounting of the cover element 30, the first housing element 21 here has multiple positioners 24 and the cover element 30 has multiple mating positioners 34. In this case, the mating positioners 34 and the positioners 24 are designed to correspond to one another to define a mounting position of the cover element 30. Because multiple positioners 24 and multiple mating positioners 34 are provided, a position of the cover element 30 in the housing 20 can be determined. As a result, the axle spindle 32 can be positioned centrally in the opening 15, via which it is possible to reduce or prevent mounting errors, in particular.

To fasten the cover element 30 in the housing 20, the cover element 30 has at least two, preferably three, retaining elements 33, which extend from the cover 31 to the second housing element so that the cover element 30 is immobilized between the first housing element 21 and the second housing element. The retaining elements 33 are designed to be elastic for a preloading between the first housing element 21 and the second housing element. Preferably, the retaining elements 33 have an elastic plastic and/or a flexible cross section. As shown in FIG. 3, the second housing element additionally has a spreading geometry 23, via which the retaining elements 33 can be pressed in opposite directions during mounting of the gear unit. The spreading geometry 23 can include, for example, two projections that are radially opposite with respect to the cover element 30 and/or the first gear 11, or a full-perimeter projection. In order to press the retaining elements 33 outward and create the preloading during mounting of the second housing element, the retaining elements 33 have a guide surface 33.1, and the spreading geometry 23 has at least one mating guide surface 23.1 in the form of guide bevels. The mating guide surface 23.1 is designed to guide the guide surface 33.1 for a deformation of the retaining elements 33 during a mounting of the gear unit. As a result, a centered mounting of the cover element 30 can be achieved. It is just as possible, however, that only one of the retaining elements 33 is guided during the mounting so that the preloading is created on one side. Consequently, the cover element 30 is held between the first housing element 21 and the second housing element by the retaining elements 33 in the manner of a clip.

Figure 2:
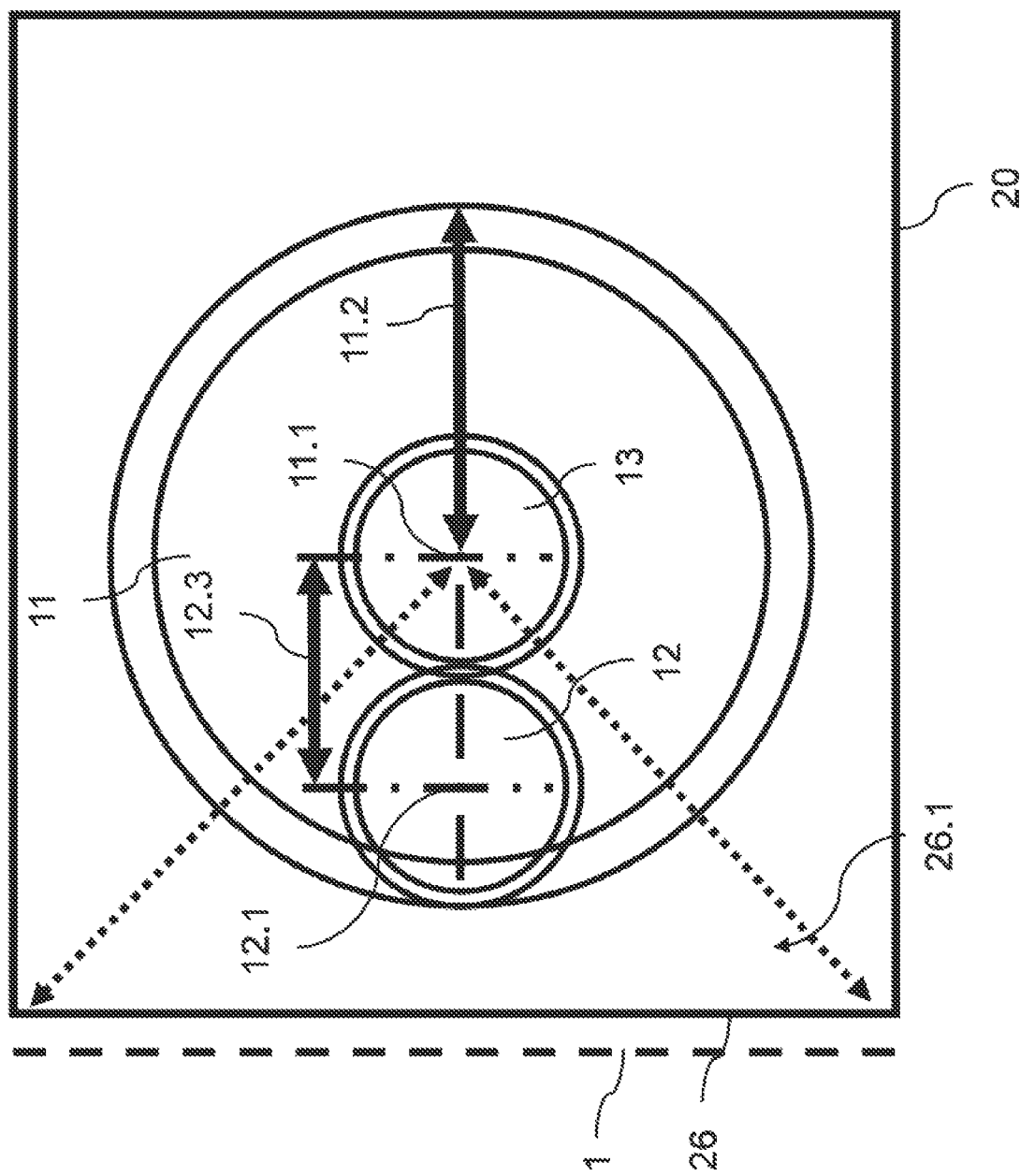
FIG. 2 shows a schematic top view of an arrangement of a gear of the drive device.

As is shown in FIGS. 1 and 2, the output axis 12.1 extends in an output region 26.1 between the mounting side 26 and the first rotational axis 11.1, and has a distance 12.3 from the first rotational axis 11.1 that is smaller than the first radius 11.2 in order to be able to arrange the output axis 12.1 as close as possible to the vehicle part 1 and/or to the opening mechanism 4. To this end, the second gear 12 has a second radius 12.2 and the third gear 13 has a third radius 13.2 that are equal to one another or essentially equal in size. For example, a speed ratio factor from the third gear 13 to the second gear 12 can be ne or nearly one. In order to be able to transmit high torques, the second gear 12 and the third gear 13 are preferably made of metal. Provision can be made that the first gear 11 is made of plastic.

Because the output axis 12.1 extends in the output region 26.1 between the mounting side 26 and the first rotational axis 11.1, the drive device 3 is compact. Thus, it has been found within the scope of the present invention that the output axis 12.1 can be moved closer to the mounting side 26, and therefore closer to the vehicle part 1 in the mounted state of the drive device 3, owing to the additional, second gear unit 10.2. In particular, owing to the second gear unit 10.2, an additional gear stage can therefore be formed that serves to reduce the distance between the output axis 12.1 and the mounting side 26.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A drive device for an opening mechanism to open a movable opening element of a vehicle, the drive device comprising:
   a drive unit to produce a drive torque;
   a housing with a mounting side that is oriented towards a vehicle part of the vehicle to mount the drive device;
   a transmission to increase the drive torque of the drive unit, the transmission comprising a first gear unit on the driven side that includes a first gear that has a first rotational axis and a first radius, and includes a second gear unit on the output side for coupling to the opening mechanism and having an output axis; and
   a cover element provided inside of the housing,
   wherein the first gear unit and the second gear unit are in operative connection with one another,
   wherein the output axis extends in an output region between the mounting side and the first rotational axis, and has a distance from the first rotational axis that is smaller than the first radius,
   wherein the second gear unit has a second gear for rotation about the output axis,
   wherein the first gear and the second gear are in operative connection through a third gear that is axially connected to the first gear,
   wherein the first gear and the second gear are separated from one another by a cover of the cover element, and wherein the housing has a spreading geometry via which at least two retaining elements of the cover element, which extend from the cover to a housing cover of the housing, are adapted to be pressed in opposite directions during mounting of the first and second gear units so that the cover element is immobilized between a first housing element of the housing and the housing cover.

2. The drive device according to claim 1, wherein the first gear, the second gear, and the third gear are each designed as a spur gear.

3. The drive device according to claim 1, wherein the cover element has, for supporting the second gear, an axle spindle that extends from the cover and defines the output axis.

4. The drive device according to claim 1, wherein the first gear and the third gear are integrally connected to one another.

5. The drive device according to claim 1, wherein the second gear has a second radius and the third gear has a third radius, and wherein the second radius and the third radius are equal or essentially equal in size.

6. The drive device according to claim 1, wherein the first gear unit is multistage in design.

7. The drive device according to claim 1, wherein the second gear and/or the third gear are made of metal.

8. The drive device according to claim 1, wherein the housing has fastening elements via which the housing is adapted to be fastened to the vehicle in a fastening direction that is substantially parallel to the first rotational axis.

9. The drive device according to claim 1, wherein the drive unit is arranged within the housing.

10. An opening system for a vehicle, the opening system comprising:
a movable opening element for uncovering a vehicle opening of the vehicle;
an opening mechanism for opening the movable opening element; and
the drive device according to claim 1.

11. The drive device according to claim 1, wherein the first gear and the third gear are both connected to a rotary guide, wherein the rotary guide is a transmission shaft.

12. The drive device according to claim 11, wherein the housing includes a first housing element and a housing cover, wherein an inner surface of the housing cover has a rotary guide receptacle extending therefrom, and wherein the rotary guide is mounted in the rotary guide receptacle.

13. A drive device for an opening mechanism to open a movable opening element of a vehicle, the drive device comprising:
a drive unit to produce a drive torque;
a housing with a mounting side that is oriented towards a vehicle part of the vehicle to mount the drive device;
a transmission to increase the drive torque of the drive unit, the transmission comprising a first gear unit on the driven side that includes a first gear that has a first rotational axis and a first radius, and includes a second gear unit on the output side for coupling to the opening mechanism and having an output axis; and
a cover element provided inside of the housing,
wherein the first gear unit and the second gear unit are in operative connection with one another,
wherein the output axis extends in an output region between the mounting side and the first rotational axis, and has a distance from the first rotational axis that is smaller than the first radius,
wherein the second gear unit has a second gear for rotation about the output axis, wherein the first gear and the second gear are in operative connection through a third gear that is axially connected to the first gear,
wherein the first gear and the second gear are separated from one another by a cover of the cover element,
wherein the housing includes a first housing element and a housing cover, wherein the first housing element has positioners that extend in parallel to the first rotational axis, and
wherein the cover of the cover element has openings through which the positioners of the first housing element extend when the cover element is mounted in the housing.

* * * * *